(12) United States Patent
Tzidon

(10) Patent No.: US 7,899,023 B2
(45) Date of Patent: Mar. 1, 2011

(54) PARTICIPANTS NETWORK

(75) Inventor: Aviv Tzidon, Tel Aviv (IL)

(73) Assignee: ST Electronics (Training & Simulation Systems) Pte Ltd., Singapore (SG)

( * ) Notice: Subject to any disclaimer, the term of this patent is extended or adjusted under 35 U.S.C. 154(b) by 812 days.

(21) Appl. No.: 10/554,778

(22) PCT Filed: Nov. 14, 2003

(86) PCT No.: PCT/SG03/00268

§ 371 (c)(1),
(2), (4) Date: Jan. 19, 2007

(87) PCT Pub. No.: WO2004/107621

PCT Pub. Date: Dec. 9, 2004

(65) Prior Publication Data

US 2007/0153680 A1 Jul. 5, 2007

Related U.S. Application Data

(60) Provisional application No. 60/474,261, filed on May 30, 2003.

(51) Int. Cl.
*H04B 7/212* (2006.01)
(52) U.S. Cl. ........................... 370/347; 370/342
(58) Field of Classification Search ............... 370/310.2, 370/315, 320, 321, 326, 328, 335, 336, 337, 370/342, 344, 347, 441, 442, 458, 461, 462
See application file for complete search history.

(56) References Cited

U.S. PATENT DOCUMENTS

| 4,593,282 | A | | 6/1986 | Acampora et al. |
|---|---|---|---|---|
| 4,724,519 | A | | 2/1988 | Barlow et al. |
| 5,396,644 | A | * | 3/1995 | Tzidon et al. ............... 370/337 |
| 6,091,717 | A | * | 7/2000 | Honkasalo et al. .......... 370/329 |
| 6,127,946 | A | * | 10/2000 | Tzidon et al. ............... 340/988 |
| 6,549,532 | B1 | * | 4/2003 | Dieudonne .................. 370/348 |
| 6,584,089 | B1 | * | 6/2003 | Honkasalo et al. .......... 370/338 |
| 6,611,512 | B1 | * | 8/2003 | Burns ......................... 370/342 |
| 6,714,546 | B1 | * | 3/2004 | Watanabe et al. ........ 370/395.2 |

FOREIGN PATENT DOCUMENTS

| EP | 0 122 765 A2 | 10/1984 |
|---|---|---|
| EP | 0 206 321 A2 | 12/1986 |

OTHER PUBLICATIONS

PCT Notification of Transmittal of the International Search Report or the Declaration for PCT Application No. PCT/SG2003/000268 mailed Jan. 23, 2004, 6 pages.
PCT Notification of Transmittal of International Preliminary Examination Report for PCT Application No. PCT/SG2003/000268 mailed Mar. 19, 2004.

* cited by examiner

*Primary Examiner*—Donald L Mills
(74) *Attorney, Agent, or Firm*—Blakely, Sokoloff, Taylor & Zafman LLP.

(57) ABSTRACT

A method for communication between a number of participants in a region, the number of participants being unlimited, the method comprising the steps: (a) allocating a unique identity to each participant; (b) allocating an order of priority for transmission by the participants based on an order of the unique identities; and (c) in each transmission of each participant there is included: (i) the unique identity of the participant; and (ii) a list of unique identities of all participants in the region.

24 Claims, 8 Drawing Sheets

PARTICIPANTS NETWORK

CROSS-REFERENCE TO OTHER APPLICATIONS

This is a National Phase of International Application No. PCT/SG2003/000268, filed on Nov. 14, 2003, which claims priority from U.S. Provisional Patent Application No. 60/474,261, filed on May 30, 2003.

FIELD OF THE INVENTION

The present invention relates to an unlimited participants network and refers particularly, though not exclusively, to an unlimited participants network providing data links and communication between participants.

BACKGROUND OF THE INVENTION

Multiplexing users over time or over code of spread spectrum are the existing techniques used to better utilize the radio spectrum by allowing multiple users to share the same physical channel. TDMA stands for "Time Division Multiple Access", while CDMA stands for "Code Division Multiple Access". Three of the four words in each acronym are identical—"Division Multiple Access"—since each technology essentially achieves the same goal. The goal is to enable more than one participant to carry on a conversation on the same physical channel without causing interference.

Where the two technologies differ is in the manner in which the participants share the common resource. TDMA divides the channel into sequential Time Slices. Each participant of the channel takes turns transmitting and receiving. Therefore, only one participant is using the channel at any given moment, but they use it for short bursts. They then give up the channel momentarily to allow other users to have their turn. This is similar to how a computer with just one processor can run multiple applications apparently simultaneously.

CDMA on the other hand really does let everyone transmit at the same time. What makes it work is a special form of digital modulation called "Spread Spectrum". This form of modulation takes the participant's packets of bits and spreads them across a very wide channel in a pseudo-random fashion. The "pseudo" is important, since the receiver must be able to undo the randomization in order to collect the bits together in a coherent order.

Some networks are "one to one" and each of the participants in turn transmits to the location where the task of the Master Of the Network ("MON") is residing.

There are other networks where the connection is "one-to-many". That is, many are allowed to listen to the message while one is transmitting. This type of network allows participants to travel far out of the MON range. Once all participants keep the Time Slice that was allocated for them, the network is functional and stable.

The similarity in the CDMA system is allocating a code of the spread spectrum rather than Time Slices in TDMA.

This type of network cannot allow a new participant to join the network when far from the MON, as they cannot be allocated a new Time Slice or code.

One known solution for this problem is to allocate spare Time Slices for a new, joining participant. The new participant is given relevant MON regulations regarding the utilization of spare Time Slices/codes. This solution cannot accommodate the arrival of a new participant where all spare Time Slices/codes are already allocated.

Existing technologies for communication between moving participants solves the issue of a distributed MON by each participant having a pre-calculated priority list. The size of the priority list is the number of Time Slices available multiplied by the maximum number of participants allowed. For example:
1. A network with a maximum of 500 participants and 200 Time Slices per second, needs to have a table of: 200 Time Slices×9 bits of user ID×500 participants=900 Kbits
2. A network with a maximum of 1000 participants and 200 Time Slices per second, needs to have a table of: 200 Time Slices×10 bits of user ID×1000 participants=2,000 Kbits The size of the table increases linearly related to the increase in the number of participants.

Each participant has to share with the rest of the network's participants its list of network members that are within receiving range of the participant. This leads to large message sizes. For example:
1. A network with a maximum of 500 participants and 200 Time Slices per second, the network message needs to be: 9 bits of user ID×500 participants=4.5 Kbits
2. A network with a maximum of 1000 participants and 200 Time Slices per second, the network message needs to be: 10 bits of user ID×1000 participants=10 Kbits The size of the network message increases linearly related to the increase in the number of participants. The network message has to be transmitted over the network by each participant. This size of the message leads to congestion and delay, and impacts on the size of the Time Slices required for each user.

The existing solution for distributed MON is fine for applications with a low number of participants. Increasing the number of participants incurs the penalty of lengthy transmission cycles, high overheads, and so forth, to the stage that this solution is no longer practical.

SUMMARY OF THE INVENTION

According to a preferred form of the present invention there is provided a method for communication between an unlimited number of participants, the method comprising the steps:
(a) allocating a unique identity to each participant;
(b) allocating an order of priority for transmission by the participants based on an order of the unique identities; and
(c) in each transmission of each participant there is included:
(i) the unique identity of the participant; and
(ii) a list of unique identities of all participants in the region.

The order of the unique identities may be that a highest unique identity is first and a lowest unique identity is last. Each participant may have data to support a decision when to transmit. The method may operate in a mode selected from the group consisting of: stable, power-on, and merge. There may be a Manager Of the Network distributed among all participants.

The method is equally applicable to TDMA and CDMA.

The region may be a local bubble and the participants may be free to move in space. A participant may transmit in a time slice of a plurality of time slices of each transmission cycle, the time slice being allocated to the participant based on the participants position in the order of priority. Preferably, the participant can not transmit in time slices of the plurality of time slices allocated to other participants.

The participant may not be able to transmit until the participant has received a transmission from all other participants in the region so the participant is aware of the number of participants in the region before transmitting.

A portion of the plurality of time slices may be reserved for maintenance. One or more of the plurality of time slices may be kept for a control channel. The portion may be able to be used for an announcement by a new participant. The portion may be an announcement corridor time slot.

In the stable mode all participants in the region may be aware of each other and the number of participants may be known. The number of time slices allocated to the announcement corridor time slot may be pre-allocated:

Each participant may determine their next time slice as a sum of: the number of participants in the region, and the portion.

A transmission may be divided into time slices based on the number of participants in the region, the participants being allocated a time slice according to their unique identifier priority.

The transmission may include the number of participants in the region. The region may be a local bubble. The local bubble may be of a size dependent on a range of transmitters used by the participants in the local bubble.

There may be a plurality of regions, there being a plurality of participants in each region, wherein adjacent regions may be merged upon a first participant in a first region receiving a transmission from a second participant in a second region.

In a final form, there is provided a computer usable medium comprising a computer program code that is configured to cause at least one processor to execute one or more functions to perform the above method.

BRIEF DESCRIPTION OF THE DRAWINGS

In order that the invention may be readily understood and put into practical effect, there shall now be described by way of non-limitative example only preferred embodiments of the present invention, the description being with reference to the accompanying illustrative drawings, in which.

DETAILED DESCRIPTION OF THE PREFERRED EMBODIMENTS

Figure 1:
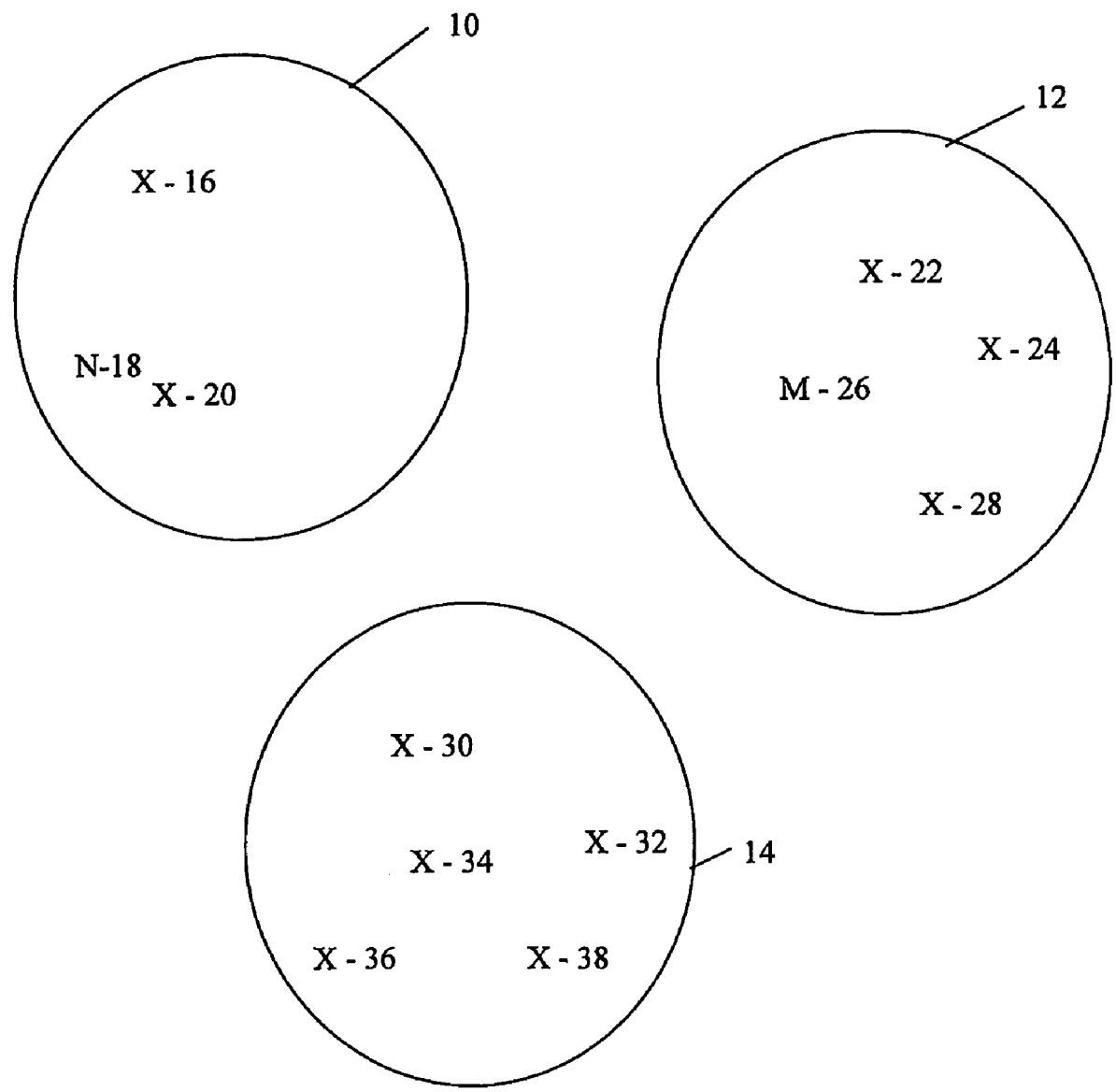
FIG. 1 is an illustration of the system arrangement for different participants.

To first refer to FIG. 1 there are shown three local bubbles 10, 12 and 14. Each local bubble 10, 12, 14 may exist in three dimensions, or may be defined two dimensionally depending on the nature of participants 16, 18, 20, 22, 24, 26, 28, 30, 32, 34, 36, 38 within each local bubble 10, 12, 14. The size of each local bubble 10, 12, 14 may also be varied according to need, requirements and the nature of the participants. The local bubbles are defined by the range of the transmitters of each participant, and propagation. Although a bubble will exist in three dimensions, it may be referred to in two dimensions, if required or desired.

For example, if the participants are infantrymen, the local bubbles 10, 12, 14 need only exist in two dimensions, and may be relatively small. Again, if the participants are land vehicles such as, for example tanks, APCs, and so forth with a limited range, the local bubbles 10, 12, 14 need to be larger but may still be referred to as a two dimensional bubble. For long-range land vehicles such as, for example, lorries, trucks, locomotives and so forth, the local bubbles may need to be even larger but still in only two dimensions. When the participants are water vessels such as, for example, warships, the local bubbles may again be two-dimensional but may need to be quite large. When aircraft are involved, the local bubbles will be three dimensional and relatively large.

All participants are generally mobile, but may be stationary from time-to-time. Communication between participants will normally be by radio frequency. Local bubble size may also be influenced by the maximum transmission range of transmitters used by the participants within a local bubble.

All participants have an identity. For participants within a local bubble, the identity ("ID") determines the priority of the order of transmission in the TDMA cycle. The higher the ID, the higher in the priority order in the TDMA cycle.

Also, by providing each participant with the capabilities and functionality of a Master of the Network ("MON") each participant has the ability to make all required decisions. In essence, the MON is equally disturbed to all participants.

Furthermore, each TDMA cycle includes an Announcement Corridor Time Slot ("ACTS") that is a pre-determined allocation of a portion of the Time Slices for use in control, general messaging, and announcement of new members. The number of Time Slices allocated to ACTS may be fixed, or varied, according to the nature of the local bubble and its participants. For example, it may be in the range of 5 to 25% of the Time Slices, preferably 10%.

All transmission by participants in a local bubble will include their ID, as well as the ID of all other participants as received by the participant in previous transmission cycles. Preferably, the number of known participants is also included. By limiting it to previous transmission cycles, if a participant leaves the local bubble, their absence is known within one or more transmission cycles, and their Time Slices can be re-allocated. To prevent the system from vibrating between a stable mode and a merge mode at any marginal communication distance, hysteresis may be included to provide the necessary buffer or offset.

The operation of the system may be in one of three principal modes—stable, power-on and merge. The system may vary between all three modes over a given time, but at any one time will be in a single mode only.

Figure 2:
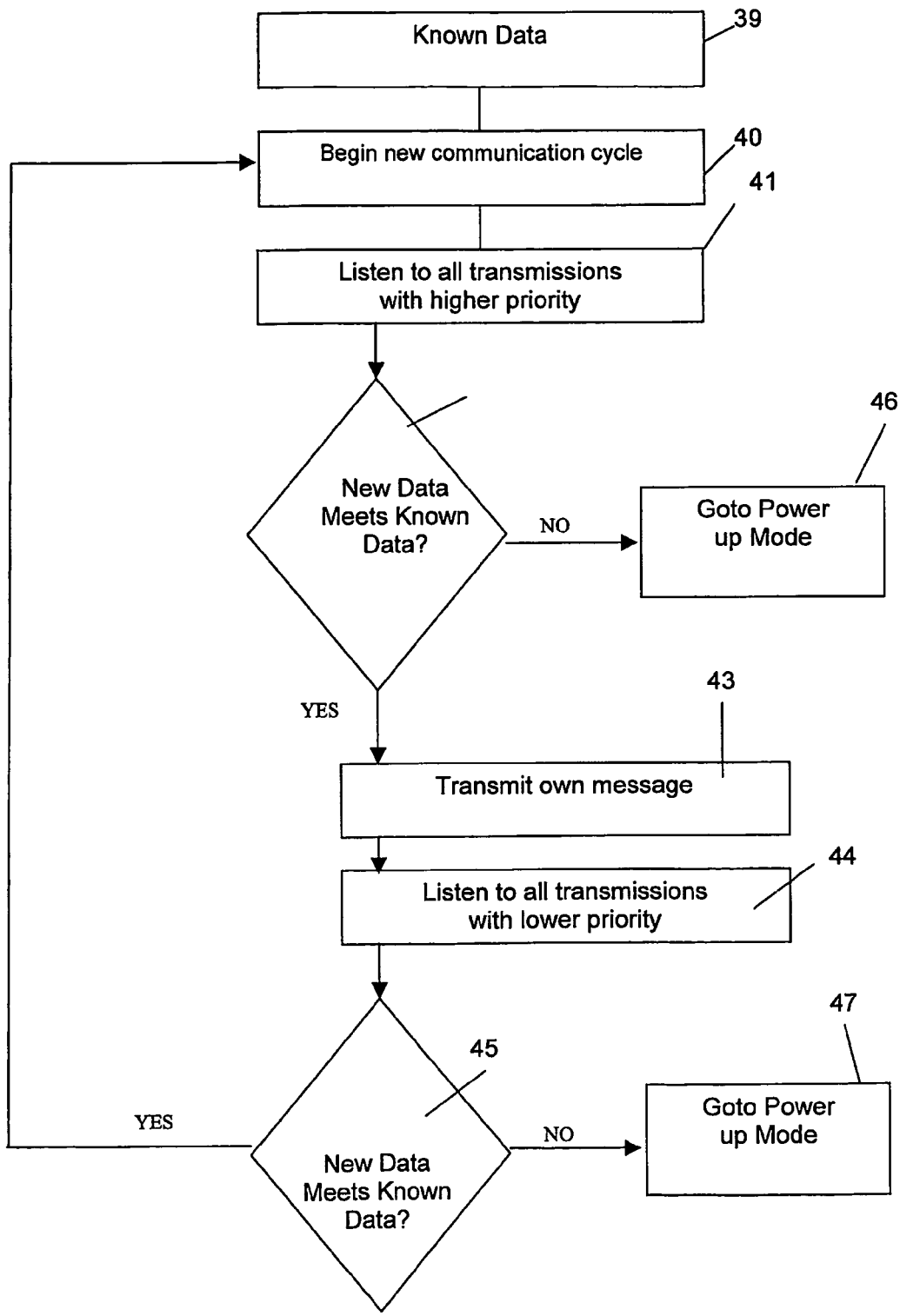
FIG. 2 is a flow chart for a stable mode.
Figure 3:
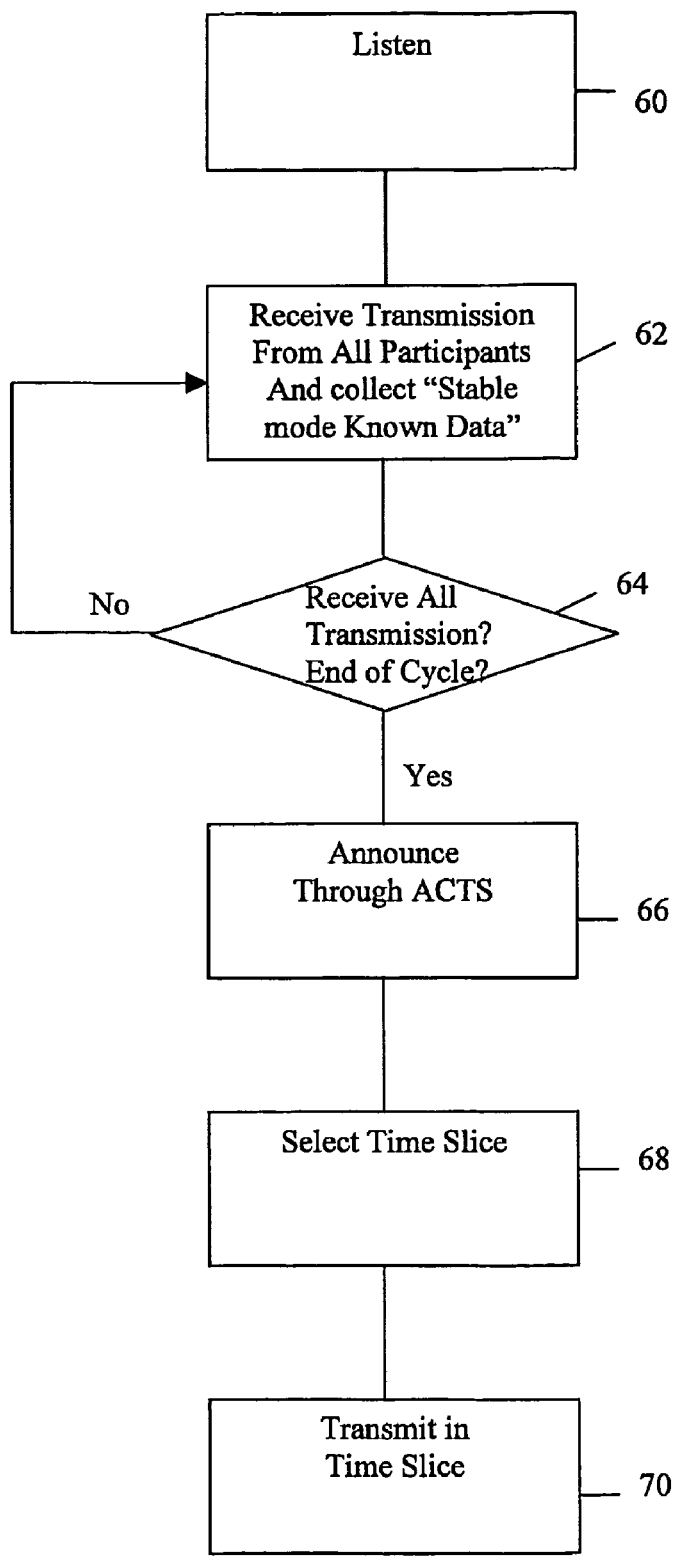
FIG. 3 is a flow chart for a first form of power on mode.

For ease of explanation the stable mode will be described first This is illustrated in FIGS. 2 and 3.

1. Stable Mode

As shown in FIG. 2, all participants in a Local bubble are aware of each other and thus the number of participants is known as is the identity ("ID") of each participant. As the ID of each participant is known, the order of priority is known—highest ID first, lowest ID last The number of Time Slices allocated to ACTS is predetermined or agreed. As such the total number of time slices in each cycle is known. Therefore, in a stable mode, each participant has the same known data: the number of participants, the number of ACTS, the total number of Time Slices in each cycle, the IDs of all participants and the transmission priority order. This is the "Stable Mode/Known Data".

The participant with highest ID has the right to use the first Time Slice of the TDMA cycle (i.e. the beginning of the communication cycle). On each message, each participant makes a virtual commitment to not transmit in any Time Slice not allocated to them (except for ACTS). In this way, all participants will have enough Time Slices in which to transmit in their turn. Each participant calculates their next Time Slice as a sum of the Number of Participants in the Local Bubble ("NPLB") and ACTS. The number time slices is calculated=NPLB+ACTS.

For example:

If NPLB=45, and ACTS=10%, then 45+10%×45=50

Therefore, for this NPLB, the TDMA network will be stabilized on a cycle of 50 Time Slices The optimal update rate, in accordance with the message size, determines the cycle duration, and the number of time slices, in an optimal cycle. There are no benefits to communicating faster than the desired update rate. Therefore when there are fewer NPLB members than the number for an optimal update rate, the cycle will not reduce beyond the optimum.

For example: Assume the previous cycle size of 50 is the optimal size to achieve the desired update rate. If the NPLB is smaller than 45, the cycle will remain at 50 time slices as this is the optimal cycle size.

As the stable mode known data is known to all participants (39), a new communication cycle begins (40). All participants transmit according to their ID priority using the procedure described above. For example, the participant with the highest ID, is given the right of first transmission so he will not spend any time at the beginning of the cycle (41) listening and will transmit their message first (43). They will then be silent for a known number of time slices. Given the above example, this will be 50 time slices. At this stage they will listen to all remaining messages (44). The next remaining participant with highest ID will be next in priority, and will transmit on the next Time Slice. All remaining participants, by their ID priority, will listen to all transmissions with a higher priority. As each participant transmits, the data is considered to determine if the transmitted data is the same as the stable mode known data (42). If the transmitted data is the same, the system will stay in stable mode and a new cycle will commence (40). Otherwise the system will go to power up mode (46).

In a similar manner a medium priority participant will be silent at the beginning of the cycle (41) allowing all participants with a higher ID to transmit while the medium priority participants listen to the transmissions. As each participant transmits, the data is considered to determine if the transmitted data is the same as the stable mode known data (42). If the transmitted data is not the same, the system will go to power up mode (46). Otherwise it is the time for the medium ID priority to transmit (43) and continue the process as explained earlier. The participant transmits their own message in their allocated Time Slice, in priority order (43). Upon the message being transmitted, all messages from participants with a lower priority order are received (44) and, again, the data for each is considered as received and compared with the stable mode known data (45). If the result at step 45 is yes after each participant has transmitted, the cycle reverts to step 41.

If the result of the comparison in steps 42 and 45 is ever "no", the system reverts to power on mode (46, 47) (described below) as either at least one new participant has joined and/or at least one participant has left. After the number of Time Slices in a complete cycle from the first transmission by the participant with the highest ID a new cycle commences and the participant with highest ID will again transmit (40). After the number of Time Slices in a cycle has been completed, a new, identical TDMA cycle will commence.

2. Power Up Mode

Figure 4:
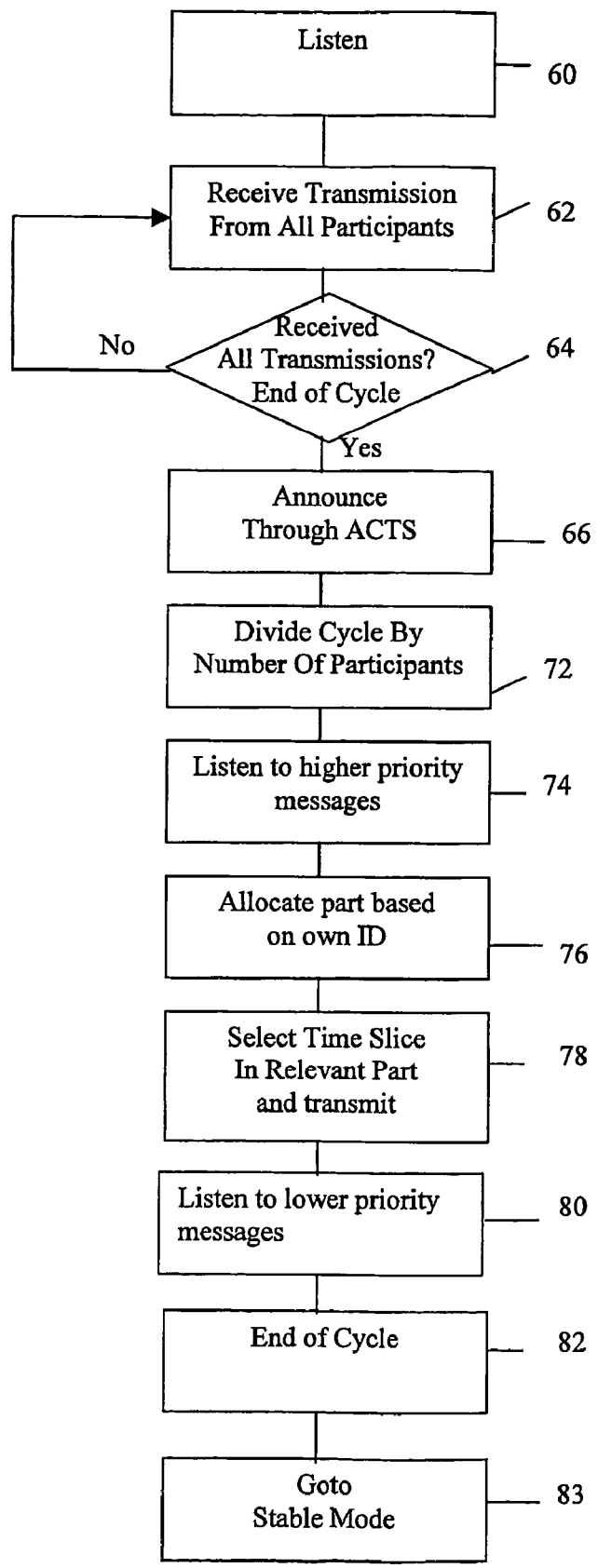
FIG. 4 is a flow chart for a second form of power on mode.
Figure 5:
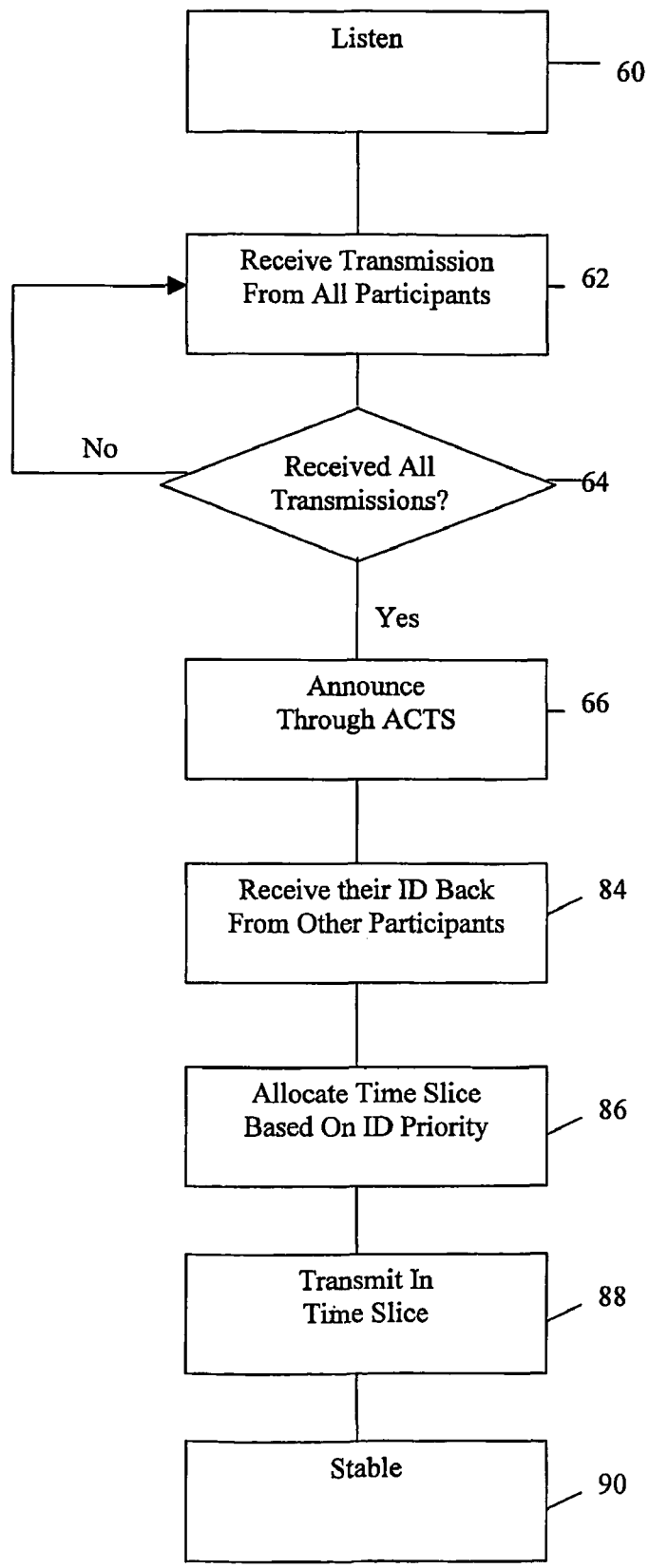
FIG. 5 is a flow chart for a third form of power on mode.

In this mode, a participant is starting their data link. There are three possible cases:

Case A: the new participant will be the only participant in the local bubble (FIG. 3);

Case B: the new participant will connect to an existing local bubble with a relatively small number participants (FIG. 4); and Case C: the new participant is going to connect to an existing Saturated Local bubble ("SB") (FIG. 5).

Since the network's design is to be able to accommodate several participants, in the first case a single participant in a local bubble may have a lot of Time Slices to choose from. Theoretically, the participant can transmit on all Time Slices; but the desirable rate to transmit should be at the rate of new information being updated.

When the network has more participants then the optimal update rate, it is a "Saturated Local bubble (SB)".

The following procedures are common to all cases:

1. The new participant starts their integration to the network by listening only (60);

2. During that phase of silence by the new participant, all available information of all other participants on the network within the local bubble and the stable mode known data is accumulated by the new participant (62). The silence should be until a full transmission cycle is complete; and 3. Once a full transmission cycle is completed all participants, including the new participant, will know the stable mode known data (64), and the new participant will announce itself through ACTS (66). As all participants know the stable mode known data, all participants have the knowledge to individually create the order of priorities based on IDs, and all participants can transmit in their correct Time Slice.

Case A: The new participant will be the only participant in the local bubble (FIG. 3).

Only after the new participant realizes they are by themselves in the local bubble, they will randomly select one of the free Time Slices (68) and use the chosen Time Slice to transmit (70). The realization will occur after a full transmission cycle is completed without any messages being received.

Case B: The new participant will connect to an existing local bubble having a relatively few participants (FIG. 4)

Since the ID of the participants defines the order of Time Slice allocation, the higher ID will always have the first Time Slice of the cycle. If a local bubble has 50% of the number for an optimal update rate, the participants would otherwise be in the beginning half of a cycle and the remaining Time Slices would be empty. It is more efficient to insert the participants according to their priority, and to spread them over the entire cycle.

This requirement may be implemented by:

After listening to the new power up cycle (64) all participants know how many participants are in the bubble.

the cycle will be divided into parts based on the number of participants (72)—into two halves for two participants, three thirds for three participants, and so on, until the number of participants is greater than half the optimum.

each participant listens to all higher priority messages (74);

according to their ID priority, they will allocate the parts with the higher ID having the first part and the lowest ID will have the last part (76);

each participant will randomly select one Time Slice out their allocated part of the cycle (78);

each participant listens to all participants with lower IDs;

The cycle ends (82) and reverts to stable mode (83)—see FIG. 2 when additional participants arrive in the bubble, the stable mode reverts back to power up mode and the power up process recommences.

Case C: The new participant will connect to an existing "saturated local bubble" (FIG. 5).

When the network has more participants than the optimal update rate it is a "saturated local bubble", yet the saturated local bubble will allow a new participant.

after the new participant receives their ID being repeated on the transmissions of the existing members of the local bubble (84);

after determining that a Time Slice with regard to their priority is available (86);

the new participant will transmit in their dynamically allocated Time Slice (88); and they become a member of the local bubble, and the mode is now a stable mode (90).

The new order of participants is similar to the old order, with the new participant being between two adjacent IDs. The determination of availability if a Time Slice is available may be by re-allocation of Time Slices, by using spares, or by using ACTS.

All power-up modes (A,B,C) are relatively temporary modes and should only last for a small number of cycles as, after the small number of cycles, the stable mode should be achieved.

Figure 6:
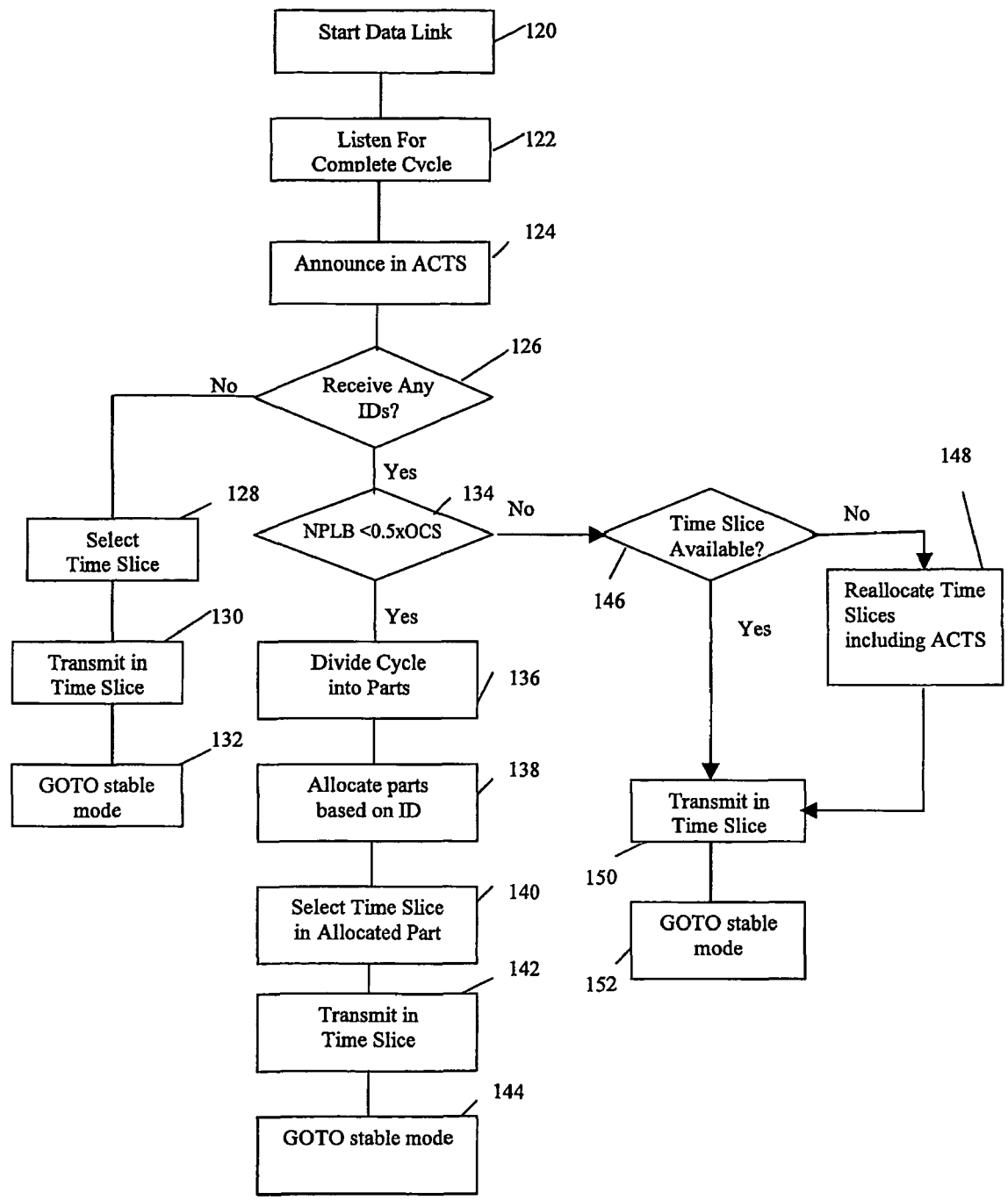
FIG. 6 is a flow chart for a participant in a power on mode.

FIG. 6 shows all three cases from the viewpoint of a participant.

Upon starting the data link (120) the participant "listens" (i.e. is in a receive only mode) for a complete transmission cycle (122). The participant can then be announced to all other participant in the ACTS portion of the next transmission cycle (124).

If the participant receives no IDs during the listening cycle (126), the participant selects their Time Slice (128) and transmits in the selected time slice (130). The stable mode is now arrived at (132)—see FIG. 2. If the participant receives one or more transmissions ("yes" for 126), it reverts to step 134. This leads to a further query—were there only a few IDs received (134)? By a few it is meant less than 50% of the number for an optimal update rate. If "yes", the cycle is divided into a number of parts (136) and the parts are allocated on a priority order based on IDs (138). In step 140, the participant selects at random a time slice in its part and transmits in that time slice (142). Again, the stable mode has now been achieved (144) (see FIG. 2).

If the result of the query at 134 is "no" (i.e. there are many IDs in the local bubble), a query is made to determine if any time slices are available (146). If not, in step 148 the Time Slices are reallocated, including those allocated for ACTS. The system then reverts to step 150. The participant then transmits in the allocated time slice (150) and the stable mode is entered (152).

3. Merge Mode

Figure 7:
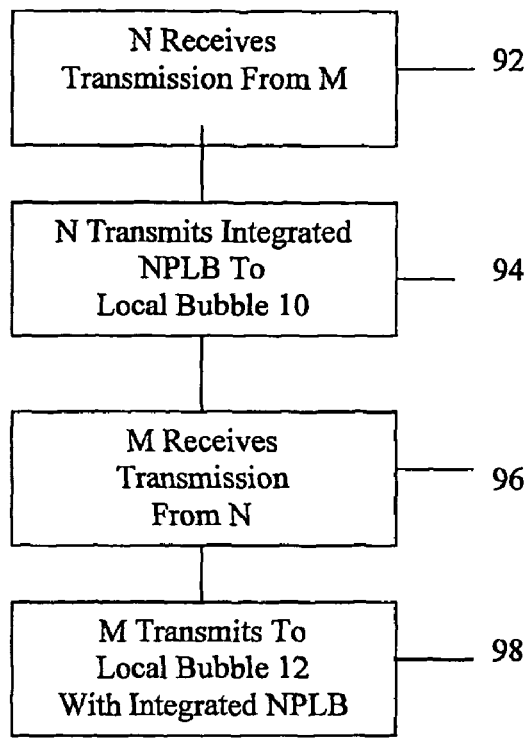
FIG. 7 is a flow chart for a first form of merge mode.

Two stable local bubbles approach each other, and a participant in one of the local bubbles becomes a bridge to connect the two local bubbles (FIG. 7).

Figure 8:
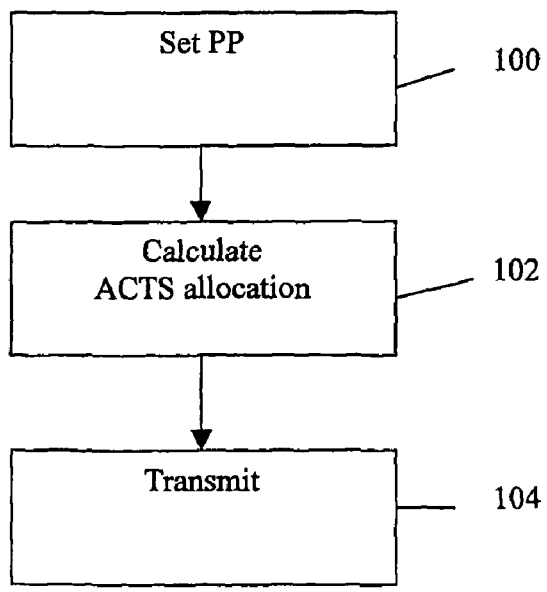
FIG. 8 is a flow chart for a second form of merge mode.

If the participant ("N") 18 in a local bubble 10 happens to be within receiving range of an adjacent participant ("M") 26 from another local bubble 12 (see FIG. 1) there are two possible cases:

Case A: N hears M on M's Time Slice (FIG. 7) and
Case B: N hears M on M's ACTS (FIG. 8).
Case A: N hears M on M's Time Slice (FIG. 7)

This case will usually be when the network of local bubble 10 is not a saturated local bubble and there is a chance that on the Time Slice that M is using no one from the N local bubble is transmitting. N can hear the transmission from adjacent local bubble 12 through the Time Slice (92). Once N has received the NPLB of the adjacent local bubble N will transmit (94) the integrated NPLB to local bubble 10 on their allocated Time Slice within local bubble 10. The integrated NPLB will contain the IDs of all participants in local bubbles 10 and 12 as N will have all of those within local bubble 10, and the transmission N received from M will have contained the IDs of all participants in local bubble 12.

When the integrated NPLB is broadcast the two local bubbles 10, 12 become one local bubble because M receives the transmission from N with the combined NPLB (96) and M will therefore transmit the NPLB in their next Time Slice in local bubble 12 (98). Therefore, each participant in both local bubbles 10, 12 are aware of each other. The update rate in both local bubble 10, 12 may be reduced linearly to accommodate the total number of participants in the network of the merged local bubbles 10, 12.

Case B: N hears M on M's ACTS (FIG. 8)

This will be when M's Time Slice is being used by a participant of N's local bubble 10. Therefore, the information from M is blocked.

The ACTS is an allocation of Time Slices for the exchange of information of IDs in order to be able to connect participants to a local bubble. According to ACTS allocation each participant transmits a short message of their existing network member's list. In order to build the order of ACTS utilization the following procedures are implemented to better facilitate the announcement of the approaching local bubble:

Each local bubble uses a portion of their ACTS as a Penetration Portion ("PP"). The PP may be set to any desired number (100) such as, for example, the order of priority to transmit on the ACTS is the same order as the allocated Time Slices. The chance to actually transmit will be a random chance such as, for example, 50%.

The determination of the ACTS allocation (102) for transmission will be

ACTS allocation=(List of the ID's in a local bubble)×random×$PP$×$NPLB$×ACTS.

When the PP is set to 36%, and random at 50% the chance to transmit (104) is 18% per ACTS, and there is a 4% chance to have RF collision. The guaranteed local bubble announcement is 96% for the first announcement cycle and 99.8% on the second.

When the PP is set to 80%, the chance to transmit is 40% Per ACTS, and a 16% chance of having a. RF collision. The guaranteed local bubble announcement is 84% for the first announcement cycle and 97% on the second.

Figure 9:
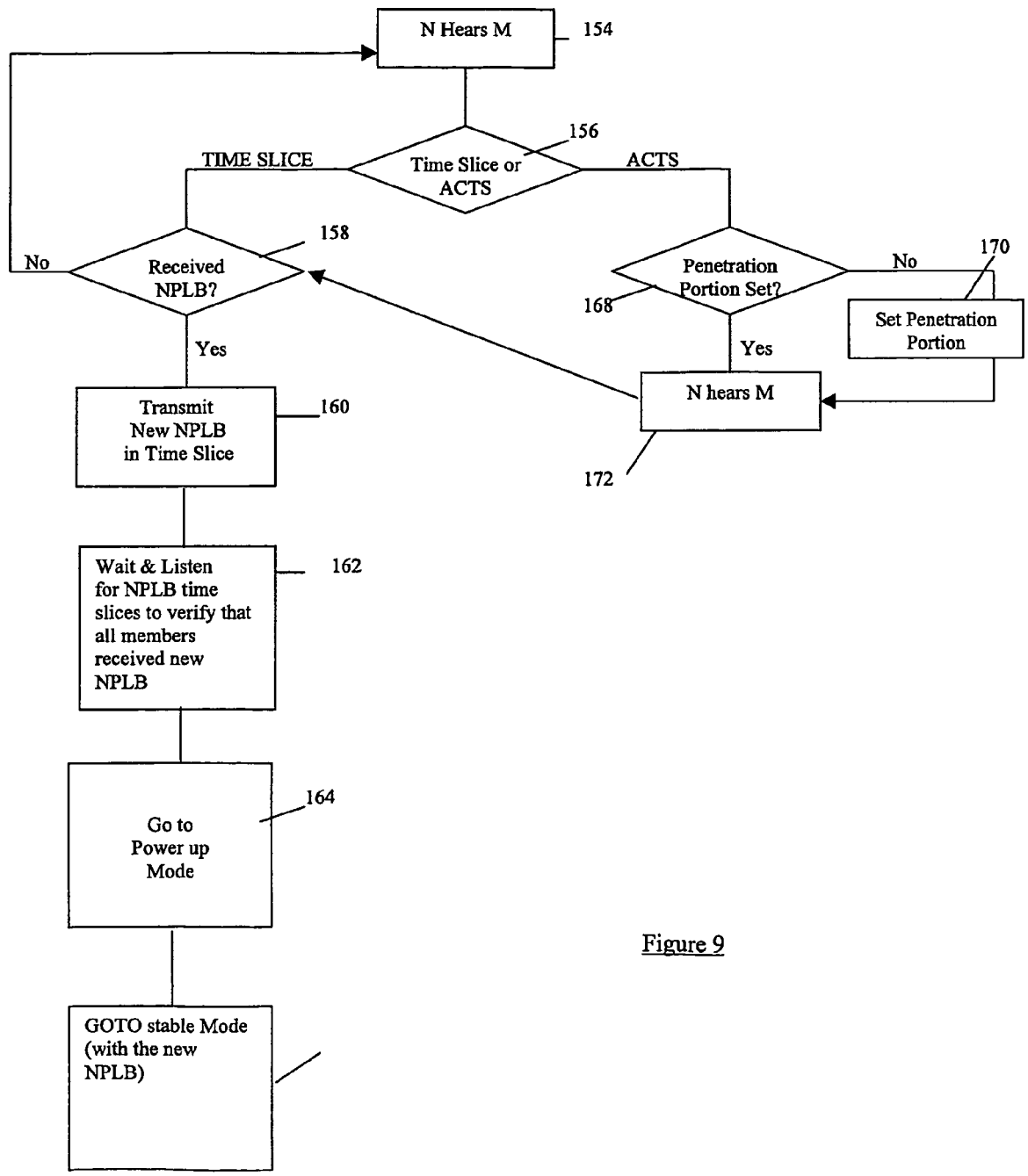
FIG. 9 is a flow chart for a participant in a merge mode.

In FIG. 9, there is shown the merge mode from a participants view. When participant N receives a transmission from M (154) it is first determined if the transmission was in M's normal Time Slice or in ACTS (156). If in the normal Time Slice, a query is raised if the number of participants in a local bubble has been received (158). If no, the system reverts to step 154 and awaits the next transmission cycle.

If yes at 158, N transmits in its Time Slice (160), the transmission including the NPLB received. At this point all other participants of the bubble 10 become aware of the fact that they are in a merge mode as they receive from N the NPLB of both bubbles. All members of N's bubble will transmit in turn in their time slices thus verifying the new NPLB (162)—this forming part of the stable mode known data. As a result, both bubbles 10, 12 become one, larger bubble and the system reverts to power up mode (164) with the merged NPLB data. The update rate is reduced to accommodate the extra numbers. The Time Slices are also reallocated based on the merged list of IDs, again in ID priority order. N may also have a new Time Slice (highly likely). The system enters the stable mode (166) with the new, merged NPLB.

If in query 156, the received transmission was in the ACTS, and if there is no penetration portion set (168), a penetration portion is set (170). N can then hear M (172) and the process reverts to step 158.

Preferably, all transmission and receptions may be automatic. An on-board computer for each vehicle can perform all necessary computations. Preferably, the on-board computer is directly linked to the transmitter and receiver to enable full digital transmission and reception. Transmission and reception may be in accordance with TDMA or CDMA standards and protocols. The vehicle may have a display for indicating the vehicles within the local bubble. In this way all participants may use the same frequency, even if in different local bubbles.

Computer usable medium comprising a computer program code that is configured to cause at least one processor to execute one or more functions to perform the method described above.

Whilst there has been described in the foregoing description preferred embodiments of the present invention, it will be understood by those skilled in the technology concerned that many variations or modifications in details of design or construction may be made without departing from the present invention.

The invention claimed is:

1. A method for communication between a number of participants in a region comprising:
    (a) allocating a unique identity to each participant of said participants;
    (b) allocating an order of priority for transmission by the participants based on an order of the unique identities; and
    (c) in each transmission of each participant there is included:
        (i) the unique identity of the participant; and
        (ii) a list of unique identities of all participants in the region, wherein said number of said participants is not predefined and
        wherein the unique identifiers of other participants are not preloaded to each of said participants.

2. A method as claimed in claim 1, wherein the order of priority of the unique identities is that a highest unique identity is first and a lowest unique identity is last.

3. A method as claimed in claim 1, wherein each participant has data to support a decision when to transmit.

4. A method as claimed in claim 1, wherein the method can operate in a mode selected from the group consisting of: stable, power-on, and merge.

5. A method as claimed in claim 1, wherein there is a Manager Of the Network distributed among all participants in the region.

6. A method as claimed in claim 1, wherein the region is a local bubble and the participants are free to move in space.

7. A method as claimed in claim 1, wherein transmission takes place in a time slice of a plurality of time slices of each transmission cycle, the time slice being allocated to the participant based on the participant's position in the order of priority.

8. A method as claimed in claim 7, wherein each participant does not transmit in time slices of the plurality of time slices allocated to other participants.

9. A method as claimed in claim 1, wherein the participant does not transmit until the participant has received a transmission from all other participants in the region so the participant is aware of the number of participants in the region before transmitting.

10. A method as claimed in claim 7, wherein a portion of the plurality of time slices is reserved for at least one selected from the group consisting of: maintenance, a control channel, and an announcement by a new participant in the region.

11. A method as claimed in claim 10, wherein the portion is an announcement corridor time slot.

12. A method as claimed in claim 11, wherein the number of time slices allocated to the announcement corridor time slot is predetermined.

13. A method as claimed in claim 11, wherein a new participant is able to first transmit in the announcement corridor time slot.

14. A method as claimed in claim 4, wherein in the stable mode all participants in the region are aware of each other and the number of participants is known.

15. A method as claimed in claim 10, wherein there is an optimum update rate that determines a cycle duration of an optimum cycle and a number of time slices in the optimum cycle, in accordance with message size.

16. A method as claimed in claim 15, wherein no cycle is shorter than the optimum cycle.

17. A method as claimed in claim 7, wherein a transmission is divided into time slices based on the number of participants in the region, the participants being allocated a time slice according to their unique identifier priority.

18. A method as claimed in claim 17, wherein the plurality of time slices are divided into parts based on the number of participants in the region, each participant randomly selecting a time slice from their allocated part for transmission to take place.

19. A method as claimed in claim 7, wherein there are a plurality of regions, there being a plurality of participants in each region, wherein adjacent regions may be merged upon a first participant in a first region receiving a transmission from a second participant in a second region.

20. A method as claimed in claim 1, wherein the transmission also includes the number of participants in the region.

21. A method as claimed in claim 1, wherein the region is a local bubble, the local bubble being of a size dependant upon a range of transmitters used by the participants in the local bubble.

22. A method is claimed in claim 1, wherein the method is performed using time division multiple access.

23. A method as claimed in claim 1, wherein the method is performed using code division multiple access.

24. Computer usable storage medium comprising a computer program code that is configured to cause at least one processor to execute one or more functions to perform operations for communication between a number of participants in a region, comprising:
    (a) allocating a unique identity to each participant of said participants of said participants;
    (b) allocating an order of priority for transmission by the participants based on an order of the unique identities; and
    (c) in each transmission of each participant there is included
        (i) the unique identity of the participant; and
        (ii) a list of unique identities of all participants in the region, wherein said number of said participants is not predefined and
        wherein the unique identifiers of other participants are not preloaded to each of said participants.

* * * * *